United States Patent Office 2,820,717
Patented Jan. 21, 1958

2,820,717

MANIFOLD SHEET AND COMPOSITION THEREFOR

Douglas Alexander Newman, Glen Cove, and Allan T. Schlotzhauer, Locust Valley, N. Y., assignors to Columbia Ribbon & Carbon Manufacturing Company, Inc., Glen Cove, N. Y., a corporation of New York No Drawing. Application August 17, 1953
Serial No. 374,814

3 Claims. (Cl. 117—36)

This invention relates to ink compositions or pastes for use in the production of carbon papers, and carbon papers prepared using such compositions.

Ink compositions for the above purpose heretofore employed have in general been composed of waxes and oils, together with pigment colors. Carbon papers produced with such compositions have the disadvantage that they tend to soften excessively when subjected to unusually high temperatures in warmer climates with resultant sticking of sheets, improper writing and allied inconveniences.

Furthermore, carbon papers produced with compositions including wax as the solid color carrier are known to have the property of increasing in tackiness in response to pressure, with the result that the smudging of sheets during handling is difficult to control.

It is further known that the weight of wax-base films which can be applied to a sheet for manifolding purposes is strictly limited by the tendency of the material to become mushy when heavily applied. If this limitation is disregarded and a coating of excessive thickness is applied, the duplicate characters made by writing through the sheet have hollow centers and are accordingly commercially inacceptable.

In accordance with the present invention, new carriers or solid bases for pigments for use in the production of carbon papers and the like have been discovered, consisting of vinyl polymers and especially soft vinyl chloride- acetate copolymer resins. Carbon papers produced with compositions having these materials as carriers have a number of technical advantages not possessed by those produced with wax bases heretofore employed, as later will be described.

Carbon papers coated with the present compositions can have coating of substantially greater thickness than heretofore employed without any tendency to become mushy and without causing hollow centers in the pressure-formed duplicate material. Hence more durable carbon paper can now be made available to the market.

The solid vinyl polymer carrier of this invention has also an excellent dispersive power for pigment colors.

Carbon papers coated with compositions according to the present invention are thorougthly resistant to heat softening due to normal room temperatures in all climates. They are also free from any tendency toward increased tackiness under pressure and hence will be noticeably cleaner handling, than is the case with wax base films.

Carbon papers coated with compositions according to the present invention are also found to have the important property of a writing strength which is very high in comparison with the smudginess of the surface. For this reason it is possible to compound the coating so as to produce excellent manifolding qualities (i. e., to give a large number of copies at one writing) without having a sheet which is excessively dirty to handle. With the ordinary wax-base layer the properties of cleanliness and good manifolding are not so nearly simultaneously obtainable in a single sheet.

Carbon papers produced with the present compositions are free of rancidity producing substances and do not dryout over long periods of time and hence, have excellent storage qualities.

An illustrative example of our new composition is as follows:

Example

| Ingredients | Parts by Weight | |
|---|---|---|
| | Range | Preferred Formula |
| Solid Base: Soft vinyl chloride-acetate copolymer (Vinylite VYHH) 85—88% vinyl chloride resins, 10,000 average apparent molecular weight (Staudinger Method) | 10 | 10 |
| Non-volatile non-drying liquid plasticizer: | | |
| Mineral oil | 20 to 35 | 27.5 |
| Coloring pigment(s) | 5 to 15 | 7.5 |
| Volatile liquid vehicle: | | |
| Ethyl acetate | Total 45 to 75 | 45 |
| Toluol | | 15 |

The vinyl polymer, oil and coloring matter are ground together, e. g., in a warm ball mill, until a smooth uniform consistency is reached. Other colors may be added or substituted as desired either dry or in oil suspension to intensify the color or change the hue.

When iron blue or similar coloring pigments are used, they are first dispersed in an equal weight of the mineral oil to simplify its addition to the mixture.

The volatile ingredients are then added and are ground with the mixture to a uniform consistency resulting in a composition having suitable viscosity for coating at room temperature. The mixture is then spread evenly on a paper base by suitable coating apparatus and allowed to cool and to harden by evaporation of the volatile ingredients to form a smooth pressure-transferable carbon coating having the properties described in detail heretofore.

In the manufacture of carbon inks according to this invention various oils, softeners and coloring materials may be used, the essential point of our invention being the use of vinyl polymers as dispersion and carrying agents for the pigment, and the discovery that inks thus compounded can be used to form pressure-transferable carbon layers having all of the beneficial properties of wax-carbon layers in addition to being significantly more heat and smudge resistant.

Variations and modifications may be made within the scope of the claims and portions of the improvements may be used without others.

We claim:

1. A pressure-transferable ink composition for pressure operative transfer media comprising, by weight, one part of vinyl chloride-vinyl acetate resin of about 87% vinyl chloride and 13% vinyl acetate content, about two and one-half parts of a non-volatile, non-drying oil, about four and one-half parts of a volatile solvent for said resin, and a quantity of coloring material.

2. A pressure-sensitive transfer member comprising an impression transmitting supporting web having on a surface thereof an adherent film of pressure transferable ink comprising, by weight, one part of vinyl chloride-vinyl acetate resin of about 87% vinyl chloride and 13% vinyl acetate content, about two and one-half parts of a non-volatile, non-drying oil, and a quantity of coloring material.

3. A pressure transferable ink composition for pressure operative media comprising, by weight, one part of vinyl chloride-vinyl acetate resin of about 87% vinyl chloride and 13% vinyl acetate content, about two and one-half parts of a non-volatile, non-drying oil, a quantity of coloring material, and volatile solvent for said resin sufficient ot reduce the mixture to coatable consistency.

References Cited in the file of this patent

UNITED STATES PATENTS

| | | |
|---|---|---|
| 2,254,072 | Jenkins | Aug. 26, 1941 |
| 2,299,014 | Foster | Oct. 13, 1942 |
| 2,603,508 | Newman | July 15, 1952 |

FOREIGN PATENTS

| | | |
|---|---|---|
| 10,136 | Australia | Feb. 1, 1934 |
| 643,463 | Great Britain | Sept. 20, 1950 |